United States Patent
Kim et al.

(10) Patent No.: US 11,065,556 B2
(45) Date of Patent: Jul. 20, 2021

(54) METHOD FOR SEPARATING AND PURIFYING MIXTURE HAVING SMALL DIFFERENCE IN BOILING POINTS

(71) Applicant: LG CHEM, LTD., Seoul (KR)

(72) Inventors: Sung Kyun Kim, Daejeon (KR); Sung Kyu Lee, Daejeon (KR); Ji Hye Kim, Daejeon (KR); Yong Mann Beyun, Daejeon (KR); Joon Ho Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/633,112

(22) PCT Filed: Aug. 17, 2018

(86) PCT No.: PCT/KR2018/009456
§ 371 (c)(1),
(2) Date: Jan. 22, 2020

(87) PCT Pub. No.: WO2019/039798
PCT Pub. Date: Feb. 28, 2019

(65) Prior Publication Data
US 2020/0230518 A1 Jul. 23, 2020

(30) Foreign Application Priority Data
Aug. 25, 2017 (KR) .................. 10-2017-0108105

(51) Int. Cl.
*B01D 3/14* (2006.01)
*B01D 3/32* (2006.01)
(Continued)

(52) U.S. Cl.
CPC .............. *B01D 3/143* (2013.01); *B01D 3/32* (2013.01); *B01D 3/007* (2013.01); *B01D 3/4205* (2013.01); *B01D 3/4222* (2013.01); *B01D 3/4294* (2013.01)

(58) Field of Classification Search
CPC .......... B01D 3/007; B01D 3/143; B01D 3/32; B01D 3/4205; B01D 3/4222; B01D 3/4294
See application file for complete search history.

(56) References Cited

U.S. PATENT DOCUMENTS 4,306,942 A * 12/1981 Brush ................ B01D 3/146
203/19
4,586,986 A * 5/1986 Preusser .................. C10G 7/08
203/22

(Continued)

FOREIGN PATENT DOCUMENTS

| CN | 1163289 C | 8/2004 |
|---|---|---|
| CN | 1812951 A | 8/2006 |

(Continued)

OTHER PUBLICATIONS

ESPACENET translation of CN 106699565 A Obtained Feb. 9, 2021. (Year: 2021).*

(Continued)

*Primary Examiner* — Jonathan Miller
(74) *Attorney, Agent, or Firm* — Dentons US LLP

(57) ABSTRACT

Provided is a method of separating and purifying a mixture of components having small difference in boiling point, and the method may maximize an energy collecting amount and collect a product to be desired in high purity and high yield.

8 Claims, 4 Drawing Sheets

(51) Int. Cl.
    *B01D 3/00*     (2006.01)
    *B01D 3/42*     (2006.01)

(56) References Cited

U.S. PATENT DOCUMENTS

| | | | |
|---|---|---|---|
| 4,774,372 A | 9/1988 | Wachi et al. | |
| 4,873,384 A | 10/1989 | Wachi et al. | |
| 4,961,826 A | 10/1990 | Grethlein et al. | |
| 5,035,776 A * | 7/1991 | Knapp | C07C 29/84 203/19 |
| 6,286,335 B1 | 9/2001 | Agrawal | |
| 9,770,674 B2 * | 9/2017 | Lee | C07C 7/04 |
| 2016/0082363 A1 * | 3/2016 | Lee | C07C 9/15 203/21 |
| 2017/0203230 A1 | 7/2017 | Raiser | |

FOREIGN PATENT DOCUMENTS

| | | |
|---|---|---|
| CN | 1984868 A | 6/2007 |
| CN | 104829436 A | 8/2015 |
| CN | 104926587 A | 9/2015 |
| CN | 105142747 A | 12/2015 |
| CN | 105229119 A | 1/2016 |
| CN | 105658291 A | 6/2016 |
| CN | 106699565 A | 5/2017 |
| EP | 1109607 A1 | 6/2001 |
| EP | 3195915 A1 | 7/2017 |
| JP | 8-19014 B2 | 2/1996 |
| JP | 2003-503307 A | 1/2003 |
| JP | 4307373 B2 | 8/2009 |
| JP | 2012-522047 A | 9/2012 |
| JP | 2015100724 A | 6/2015 |
| KR | 10-2006-0026476 A | 3/2006 |
| KR | 10-2007-0070093 A | 7/2007 |
| KR | 10-2007-0070124 A | 7/2007 |
| KR | 10-2014-0092783 A | 7/2014 |
| KR | 10-1550150 B1 | 8/2015 |
| KR | 10-2015-0145054 A | 12/2015 |
| KR | 10-2017-0074658 A | 6/2017 |
| SK | 1962-2000 A3 | 7/2001 |
| WO | 99/65582 A1 | 12/1999 |

OTHER PUBLICATIONS

You, et al., "Low Pressure Design for Reducing Energy Cost of Extractive Distillation for Separating Diisopropyl Ether and Isopropyl Alcohol", Chemical Engineering Research and Design, Elsevier, 2016, 109, pp. 540-552. (10.1016/j.cherd.2016.01.026. hal-01340000).

* cited by examiner

[FIG. 1]
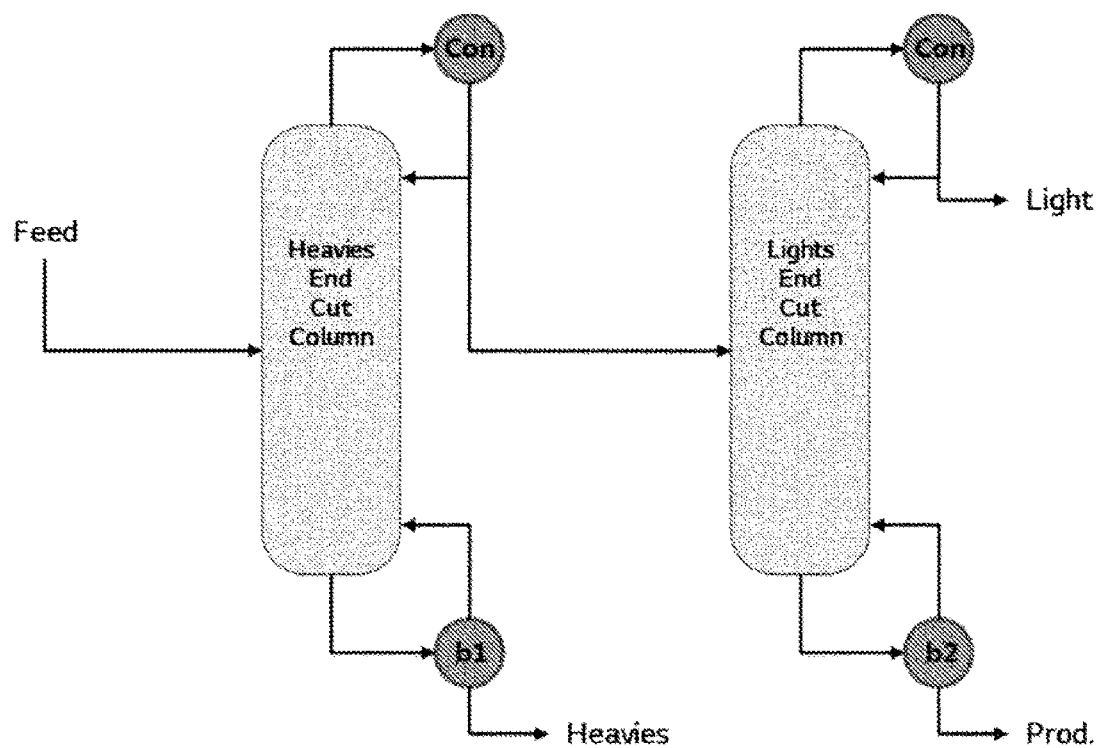

[FIG. 2]
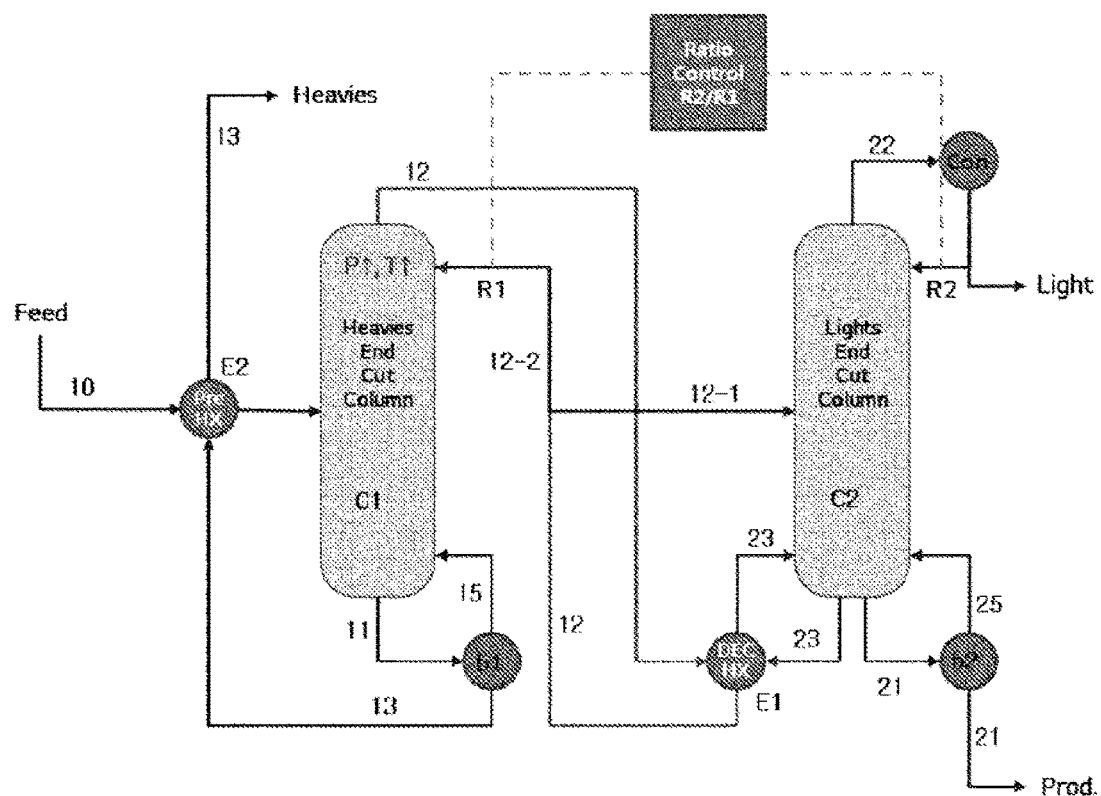

[FIG. 3]
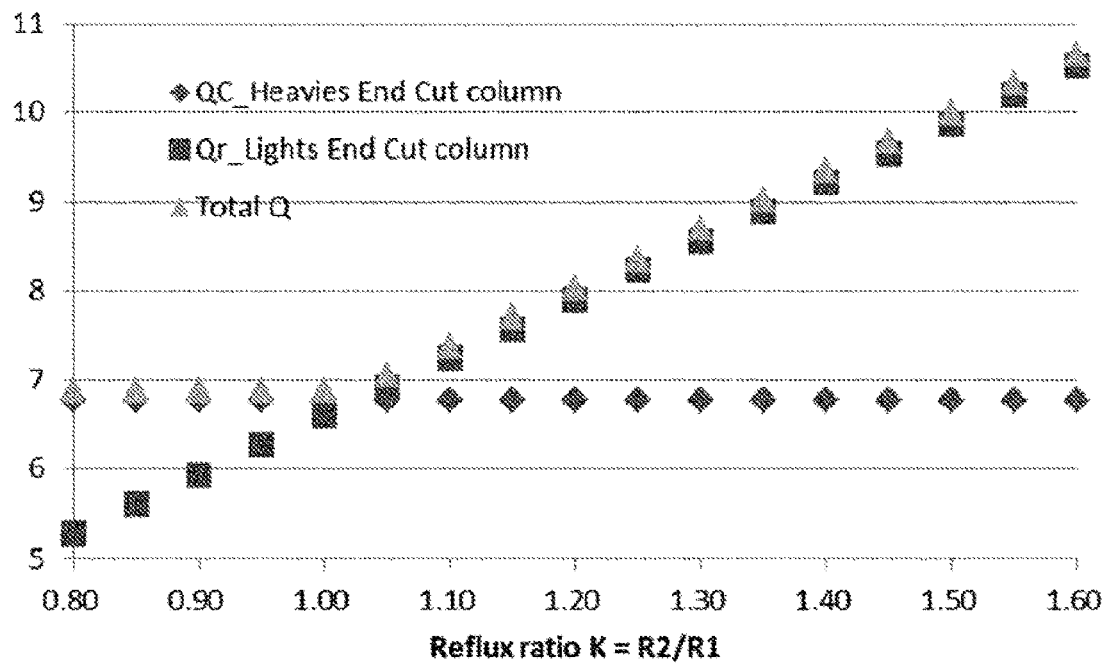
[FIG. 4]
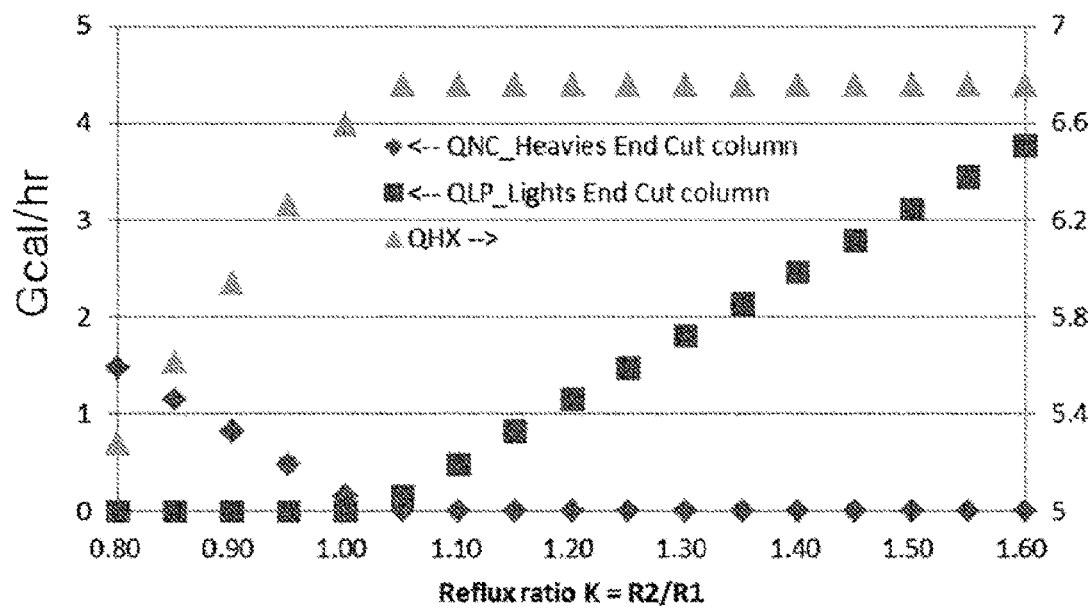

【FIG. 5】
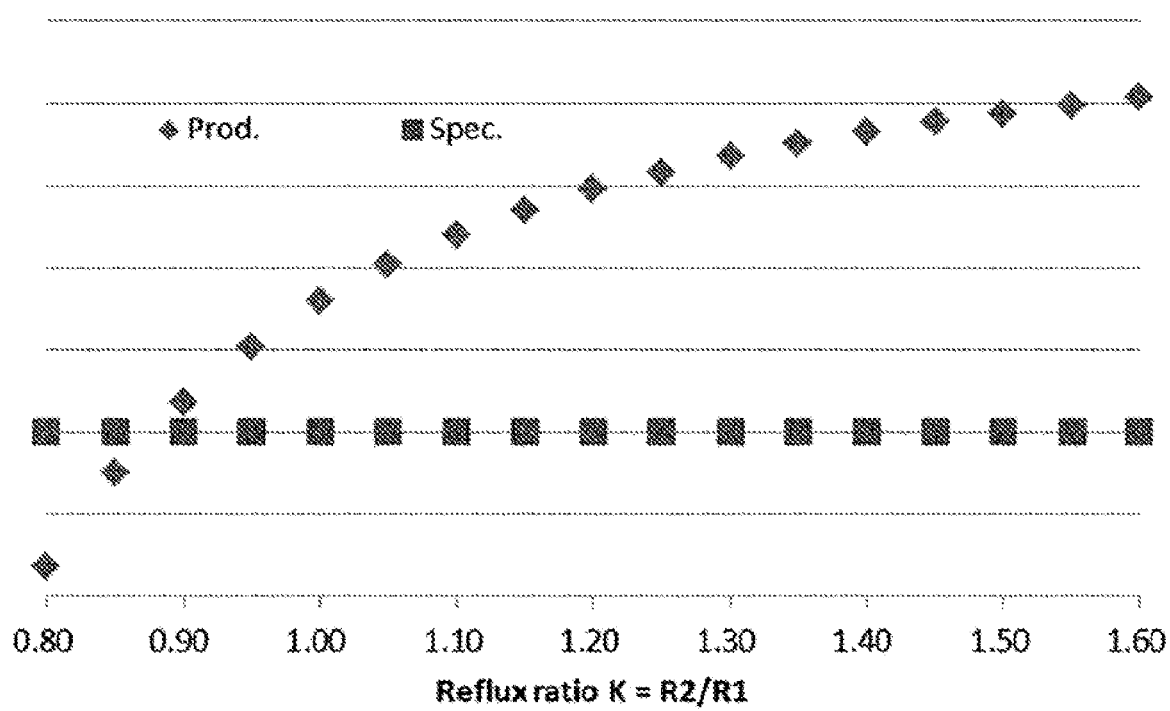

METHOD FOR SEPARATING AND PURIFYING MIXTURE HAVING SMALL DIFFERENCE IN BOILING POINTS

CROSS-REFERENCE TO RELATED APPLICATIONS

This application is the U.S. national stage of international application No. PCT/KR2018/009456, filed on Aug. 17, 2018, and claims the benefit of priority to Korean Patent Application No. 10-2017-0108105, filed on Aug. 25, 2017, the disclosures of which are incorporated as a part herein in their entirety.

TECHNICAL FIELD

The present invention relates to a method of separating and purifying a mixture of three or more components having small difference in boiling point.

BACKGROUND ART

In a chemical process, a mixture of three or more components should be often separated and purified. In this case, a distillation process by difference in boiling point is often used in most of the separation and purification processes. However, when the difference in boiling point of the components is small, it is difficult to efficiently proceed with the separation and purification process.

FIG. 1 schematically illustrates a general ternary separation and purification process. In a first distillation column (a heavy end cut column), heavy components are separated in a lower portion, and a product to be collected and light components are collected in an upper portion. The collected product and the light components are sent again to a second distillation column (a light end cut column), and the light components are separated in the upper portion and the product is produced in the lower portion.

However, when the difference in boiling point between the main components of the light components and the heavy components is within 15° C., distillation column separation becomes difficult, and additional process energy is taken thereon and operation stability is inhibited.

Accordingly, there is a need to develop a process to allow a desired product to be collected in high yield with less energy from a multi-component mixture having small difference in boiling point.

DISCLOSURE

Technical Problem

The present invention is directed to providing an energy saving process which may efficiently separate and purify a mixture including three or more components having small difference in boiling point, and secure operation stability.

Technical Solution

In one aspect, a method of purifying a mixture includes:
feeding a mixture of three or more components having different boiling points from each other to a first distillation column to obtain heavy components from a lower portion of the first distillation column, and obtain an upper fraction including light components and a product to be collected from an upper portion of the first distillation column; and feeding the upper fraction to a second distillation column to collect a first lower fraction rich in the product from a lower portion of the second distillation column, and collect the light components from an upper portion of the second distillation column, wherein heat possessed by the upper fraction collected from the upper portion of the first distillation column is fed to the lower portion of the second distillation column through a first heat exchanger, after the upper fraction of the first distillation column feeds the heat to a second lower fraction collected from the lower portion of the second distillation column in the first heat exchanger, a part of the upper fraction of the first distillation column is fed to the second distillation column as a feed stream, and the rest of the upper fraction of the first distillation column is refluxed (R1) to the upper portion of the first distillation column, a part of the light components collected from the upper portion of the second distillation column C2 is condensed and refluxed (R2) to the second distillation column C2, and when a ratio of an upper reflux R2 of the second distillation column and an upper reflux R1 of the first distillation column (R2/R1) is K, K is 1.05 or more and 1.5 or less.

According to an exemplary embodiment, the difference in boiling point of each component included in the mixture of three or more components having different boiling points from each other may be within 15° C.

Operation pressure of the first distillation column may be higher than operation pressure of the second distillation column by 3.5 $kgf/cm^2$ or more.

According to an exemplary embodiment, the second lower fraction of the second distillation column to which the heat is fed from the first heat exchanger may be refluxed to the second distillation column.

According to an exemplary embodiment, a part of the first lower fraction of the second distillation column may be reheated and then refluxed.

According to an exemplary embodiment, all of the upper fraction of the first distillation column may be fed to the first heat exchanger, and a separate condenser may not be provided in the upper portion of the first distillation column.

According to an exemplary embodiment, the heavy components collected from the lower portion of the first distillation column may be reheated, and then, may be used in preheating of the mixture fed to the first distillation column through a second heat exchanger and collected.

According to an exemplary embodiment, a part of the heavy components which are collected from the lower portion of the first distillation column and then reheated may be refluxed.

Advantageous Effects

According to the present invention, in a process of separating and purifying a mixture of multi-components having small difference in boiling point, energy saving and operation stability may be secured, while purification efficiency may be maximized.

BRIEF DESCRIPTION OF DRAWINGS

FIG. 1 schematically illustrates a general separation and purification process of a ternary mixture.

FIG. 2 schematically illustrates a process according to an exemplary embodiment of the present invention.

FIG. 3 is a graph showing total energy depending on a reflux ratio.

FIG. 4 is a heat exchange amount depending on a reflux ratio.

FIG. 5 is a composition depending on a reflux ratio.

BEST MODE FOR CARRYING OUT THE INVENTION

Hereinafter, the method according to the present invention will be described referring to FIGS. 2 to 5, and since the drawings are only an exemplary embodiment of the present invention, they should not be regarded as limiting the protection scope of the invention which is apparent from the claims and the entire specification.

The present invention relates to a method of separating and purifying a mixture including three or more components having difference in boiling point within 15° C., or within 10° C.

The present invention may be also used in a method of separating and purifying 1-butene more economically in high purity and high yield from a raffinate-2 stream discharged from a separation process of a C4 mixture. However, the present invention is not limited to this use, and may be efficiently utilized in a separation and purification process of a multi-component mixture having small difference in boiling point.

FIG. 2 illustrates a method according to an exemplary embodiment of the present invention.

The method of purifying a mixture according to the present invention includes:

feeding a mixture 10 including three or more components having small difference in boiling point to a first distillation column C1 to obtain heavy components 11 from a lower portion of the first distillation column C1, and collect an upper fraction 12 of the first distillation column including a product to be collected from the upper portion; and feeding the upper fraction 12 to a second distillation column C2 to collect a first lower fraction 21 rich in the product to be collected from a lower portion of the second distillation column C2, and collect the light components 22 from an upper portion of the second distillation column C2, wherein heat possessed by the upper fraction 12 collected from the upper portion of the first distillation column C1 is fed to the lower portion of the second distillation column C2 through a first heat exchanger E1, and when a ratio of an upper reflux R2 of the second distillation column and an upper reflux R1 of the first distillation column (R2/R1) is K, K is 1.05 or more and 1.5 or less, as one characteristic of the present invention.

That is, after the upper fraction 12 of the first distillation column C1 feeds the heat to a second lower fraction 23 collected from the lower portion of the second distillation column C2 in the first heat exchanger E1, a part 12-1 of the upper fraction of the first distillation column is fed to the second distillation column C2 as a feed stream, and the rest 12-2 of the upper fraction of the first distillation column is refluxed (R1) to the upper portion of the first distillation column C1.

In addition, a part of the light components 22 collected from the upper portion of the second distillation column C2 is condensed with a condenser Con to be refluxed (R2) to the second distillation column C2.

When the K value is less than the above range, a non-condensed heat source occurs to reduce operation stability, and in a severe case, the product may not satisfy a desired standard. In addition, when the K value is more than the above range, a heat source required for the second distillation column is increased more than necessary, so that the total calories are increased more than those of the conventional process, and thus, there may be no meaning to utilize the heat source in the upper portion of the first distillation column. A preferred range of the K value may be 1.05 or more and 1.5 or less, or 1.3 or less, or 1.1 or less.

Meanwhile, the operation pressure of the first distillation column may be higher than the operation pressure of the second distillation column by 3.5 kgf/cm$^2$ or more. This is because it was confirmed that a condensation temperature of the first distillation column is advantageous for double-effect distillation (DEC) to have enough pressure to heat the second distillation column. A preferred range is 3.5 to 5.5 kgf/cm$^2$, or 3.5 to 5.0 kgf/cm$^2$, or 4.0 to 5.5 kgf/cm$^2$, or 4.0 to 5.0 kgf/cm$^2$.

In addition, the second lower fraction 23 of the second distillation column C2 to which heat is fed from the first heat exchanger E1 is refluxed to the second distillation column C2.

In addition, a part 25 of the first lower fraction 21 of the second distillation column C2 may be reheated by a reheater b2 and then refluxed to the second distillation column C2.

It is advantageous that the lower fraction of the second distillation column C2 is divided into the first lower fraction 21 and the second lower fraction 23 and injected to the heat exchanger, respectively, since the heat may be used when calories required for the second distillation column are not fed from the reheater b2 and start-up for an initial process.

According to an exemplary embodiment, all of the upper fraction 12 of the first distillation column C1 may be fed to the first heat exchanger E1, and a separate condenser may not be provided in the upper portion of the first distillation column C1. That is, the condenser may be omitted by double-effect distillation (DEC) using the first heat exchanger.

The heavy components 11 collected from the lower portion of the first distillation column C1 may be reheated by the reheater b1, and then a part 13 of the heavy components 11 are used in preheating of the mixture 10 fed to the first distillation column C1, through a second heat exchanger E2 and then collected.

Here, a part 15 of the heavy components which are collected from the lower portion of the first distillation column C1 and then reheated by the reheater b1 may be refluxed to the first distillation column C1.

The method according to the present invention is very good in term of having an energy saving effect of 30% or more.

EXAMPLES

Hereinafter, the Examples of the present invention will be described.

Examples 1 to 4

A mixture having the properties shown in the following Table 1 was subjected to 1-butene purification using the process illustrated in FIG. 2. Process conditions and results are shown in Table 2.

TABLE 1

| Component | Mass Frac. |
|---|---|
| C3's | 0.48% |
| C4 paraffin | 29.18% |
| 1-butene | 43.73% |

TABLE 1-continued

| Component | Mass Frac. |
|---|---|
| Isobutene | 0.25% |
| C4 olefin | 25.94% |
| C5's | 0.42% |
| Sum | 100% |

Comparative Example 1

A purification process was carried out using the process illustrated in FIG. 1 under the conditions shown in Table 2.

Comparative Examples 2 to 4

The purification process of FIG. 2 was carried out, except that the reflux ratio K is changed as shown in Table 2.

TABLE 2

| | | Comp. Ex. 1 | Comp. Ex. 2 | Comp. Ex. 3 | Comp. Ex. 4 | Example 1 | Example 2 | Example 3 | Example 4 |
|---|---|---|---|---|---|---|---|---|---|
| Heavy end cut column | Upper portion pressure (KG) | 5.7 | 10.1 | 10.1 | 10.1 | 10.1 | 10.1 | 10.1 | 10.1 |
| | Upper portion temperature (° C.) | 51.8 | 73.1 | 73.1 | 73.1 | 73.1 | 73.1 | 73.1 | 73.1 |
| | Cond. Q (G cal/hr) | 5.43 | 6.76 | 6.76 | 6.76 | 6.76 | 6.76 | 6.76 | 6.76 |
| | QNC (G cal/hr) | 0.00 | 1.48 | 0.49 | 0.00 | 0.00 | 0.00 | 0.00 | 0.00 |
| | Reb. Q (G cal/hr) | 5.42 | 6.90 | 6.90 | 6.90 | 6.90 | 6.90 | 6.90 | 6.90 |
| Light end cut column | Upper portion pressure (KG) | 6.6 | 6.6 | 6.6 | 6.6 | 6.6 | 6.6 | 6.6 | 6.6 |
| | Lower portion temperature (° C.) | 61.9 | 61.9 | 61.9 | 61.9 | 61.9 | 61.9 | 61.9 | 61.9 |
| | Product purity (%) | Spec. in | Spec. Out | Spec. in | Spec. in | Spec. in | Spec. in | Spec. in | Spec. in |
| | Cond. Q (G cal/hr) | 5.18 | 5.32 | 6.31 | 10.57 | 6.96 | 7.29 | 8.60 | 9.91 |
| | Reb. Q (G cal/hr) | 5.20 | 5.28 | 6.27 | 10.53 | 6.92 | 7.25 | 8.56 | 9.87 |
| | QLP (G cal/hr) | 5.20 | 0.00 | 0.00 | 17.29 | 13.68 | 14.01 | 15.32 | 16.63 |
| Energy comparison | K (reflux ratio) | | 0.80 | 0.95 | 1.60 | 1.05 | 1.10 | 1.30 | 1.50 |
| | Process collecting calorie (G cal/hr) | 0.00 | 5.28 | 6.27 | 6.76 | 6.76 | 6.76 | 6.76 | 6.76 |
| | CW used calorie (G cal/hr) | 10.61 | 6.80 | 6.80 | 10.57 | 6.96 | 7.29 | 8.60 | 9.91 |
| | Total Q (G cal/hr) | 10.62 | 6.90 | 6.90 | 10.66 | 7.06 | 7.38 | 8.70 | 10.01 |
| | Reduction ratio (%) | — | 35.07 | 35.07 | −0.40 | 33.56 | 30.47 | 18.13 | 5.78 |

From the above results, it was found that when the K value is less than 1.05, a vapor uncondensed heat source (QNC) occurs in the upper portion of the first distillation column to reduce operation stability, and in a severe case, the product may not satisfy a desired standard (Comparative Examples 2 and 3).

In addition, when the K value is more than 1.5, a heat source required for the second distillation column is increased more than necessary, so that the total calories are increased more than those of the conventional process, and thus, it was found that there is no meaning to utilize the heat source in the upper portion of the first distillation column (Comparative Example 4).

It was confirmed from Examples 1 to 4 that when the K value is more than 1.05, operation stability and a product standard are secured, so that the heat source required for the second distillation column (QLP) tends to be increased. In addition, in Examples 1 to 4, upper portion pressure difference between the first distillation column C1 and the second distillation column C2 is 3.5 kgf/cm² or more, and thus, it was found that heat exchange is possible and energy is saved.

FIGS. 3 to 5 are graphs analyzing total energy, a heat exchange amount, and a composition depending on the K value, respectively. Only the reflux ratio of the second distillation column was changed, while the operation conditions of the first distillation column were maintained identically.

It is shown in FIGS. 3 to 5 that the feeding calories Qc are constant, which represents that the heat source which may be fed to the second distillation column is limited.

In a section in which the K value is less than 1.05, total energy (total Q) has a constant value, and in a section in which the K value is more than 1.05, total Q tends to be increased.

In a section in which the K value is less than 1.05, feeding calorie Qc is larger than required calorie Qr, and thus, required process energy is maintained at a constant value.

In a section in which the K value is more than 1.05, feeding calorie Qc is smaller than required calorie Qr, and thus, required process energy is increased.

In a section in which the K value is less than 1.05, uncondensed calorie (QNC) occurs, and thus, it is seen that vapor in the upper portion of the first distillation column is not completely condensed and process operation becomes unstable.

In a section in which the K value is more than 1.05, LP required calorie (QLP) occurs, so that utility required for the second distillation column is increased and total Q is increased.

When the K value is increased, the composition of the product tends to be increased, and when the K value is 0.95 or more, the standard is appropriate.

As described above, preferred exemplary embodiments of the present invention have been described, but the scope of the present invention is not limited thereto, and the present invention has been described in detail in specific parts, and it is obvious that such specific technique is only a preferred embodiment to a person skilled in the art, without limiting the scope of the present invention thereby. Thus, the substantial scope of the present invention will be defined by the appended claims and their equivalents.

The invention claimed is:

1. A method of purifying a mixture, the method comprising:
   feeding a mixture of three or more components to a first distillation column, each of the three or more components having different boiling points;
   obtaining a lower fraction from a lower portion of the first distillation column, the lower fraction of the first distillation column comprising heavy components, and obtaining an upper fraction from an upper portion of the first distillation column, the upper fraction of the first distillation column comprising light components and a product to be collected;
   feeding the upper fraction of the first distillation column to a second distillation column,
   collecting a first lower fraction from a lower portion of the second distillation column, the first lower fraction of the second distillation column comprising the product; and
   collecting an upper fraction from an upper portion of the second distillation column, the upper fraction of the second distillation column comprising lights components,
   wherein heat possessed by the upper fraction of the first distillation column is fed to the lower portion of the second distillation column through a first heat exchanger, such that the heat is fed to a second lower fraction collected from the lower portion of the second distillation column,
   subsequently, feeding a part of the upper fraction of the first distillation column to the second distillation column as a feed stream, and refluxing a remaining part of the upper fraction of the first distillation column to the upper portion of the first distillation column,
   condensing and refluxing a part of the light components collected from the upper portion of the second distillation column to the second distillation column, and
   controlling a ratio K of an upper reflux R2 of the second distillation column and an upper reflux R1 of the first distillation column (R2/R1) to be from 1.05 to 1.5.

2. The method of purifying a mixture of claim 1, wherein the difference between the boiling point of each of the three or more components of the mixture is 15° C. or less.

3. The method of purifying a mixture of claim 1, wherein an operating pressure of the first distillation column is higher than an operating pressure of the second distillation column by 3.5 kgf/cm$^2$ or more.

4. The method of purifying a mixture of claim 1, wherein the second lower fraction of the second distillation column to which the heat is fed from the first heat exchanger is returned to the second distillation column.

5. The method of purifying a mixture of claim 1, wherein a part of the first lower fraction of the second distillation column is reheated and then returned to the second distillation column.

6. The method of purifying a mixture of claim 1, wherein the upper fraction of the first distillation column is fed to the first heat exchanger, and a separate condenser is not provided in the upper portion of the first distillation column.

7. The method of purifying a mixture of claim 1, wherein the heavy components collected from the lower portion of the first distillation column are reheated, and then a part of the heavy components are used in preheating of the mixture fed to the first distillation column through a second heat exchanger and then collected.

8. The method of purifying a mixture of claim 7, wherein a remaining part of the heavy components which are collected from the lower portion of the first distillation column and then reheated is returned to the first distillation column.

* * * * *